United States Patent [19]
Benoit

[11] Patent Number: 5,975,572
[45] Date of Patent: Nov. 2, 1999

[54] WHEEL AND TIRE SAFETY GUARD

[75] Inventor: Robert J. Benoit, North Cobalt, Canada

[73] Assignee: Stuart A. Busse, Saskatchewan, Canada

[21] Appl. No.: 08/787,966

[22] Filed: Jan. 23, 1997

[51] Int. Cl.⁶ .......................... B60R 19/00; B60R 19/42
[52] U.S. Cl. ...................... 280/768; 280/770; 293/126
[58] Field of Search ...................... 280/760, 849, 280/154, 160, 762, 848, 153.5, 770, 304.3; 180/271; 293/126, 118

[56] References Cited

U.S. PATENT DOCUMENTS

| | | | |
|---|---|---|---|
| 2,002,823 | 5/1935 | Marvel et al. | 280/770 |
| 2,609,218 | 9/1952 | Van Antwerp | 280/848 |
| 4,401,331 | 8/1983 | Ziner et al. | 280/770 |
| 5,823,586 | 10/1998 | Marley | 293/126 |

*Primary Examiner*—Lanna Mai
*Assistant Examiner*—Jason S. Brooks
*Attorney, Agent, or Firm*—Cowan, Liebowitz & Latman, P.C.; R. Lewis Gable

[57] ABSTRACT

A safety guard is provided for preventing a wheel from coming off the body of a vehicle. The safety guard includes a first attachment releasably secured to the body on one side of the wheel and a second attachment releasably secured to the body on a transversely opposing side of the wheel. A restraining member is removably secured in a transversely slidable engagement with and between the first and second attachments and immediately adjacent an outer face of the wheel so as to prevent movement of the wheel away from the body.

12 Claims, 1 Drawing Sheet

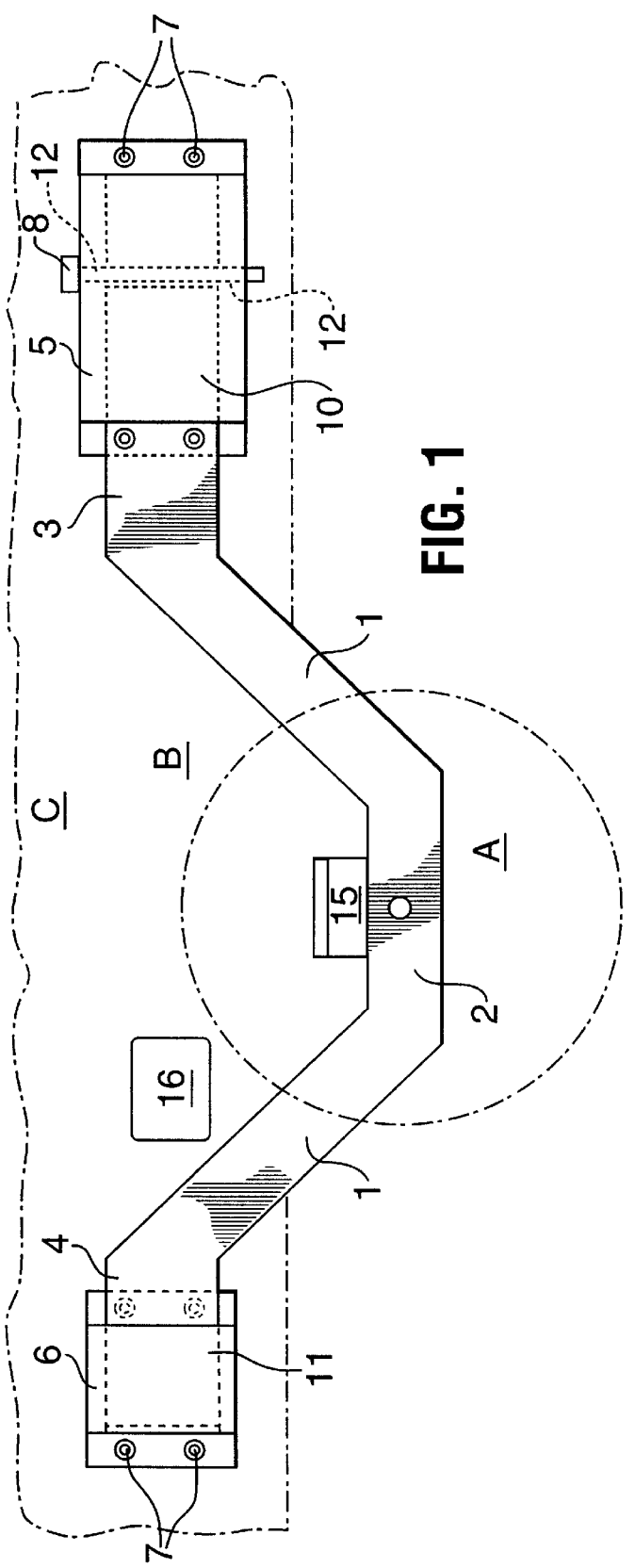

WHEEL AND TIRE SAFETY GUARD

FIELD OF THE INVENTION

This invention relates generally to a device for preventing a wheel from entirely leaving its axle or a vehicle which it supports.

BACKGROUND OF THE INVENTION

The problem of wheels and tires accidentally coming off moving vehicles continues to pose a danger to the safety of people and property both inside and outside such vehicles. This problem may occur due to a failure in the fastening mechanisms, such as nuts and bolts, between a wheel and the vehicle, or due to a faulty tire. Although attempts have been made to increase the reliability of such fastening mechanisms and of the tires themselves, no mechanical system is yet fail-proof.

SUMMARY OF THE INVENTION

This invention can reduce these dangers by providing a restraining member to be installed on the vehicle body in front of the wheel to prevent the wheels and tires from coming off the vehicle. The invention provides means for convenient installation and removal of the restraining member for wheel repair and maintenance.

Accordingly, the present invention relates to a safety guard for preventing a wheel from coming off the body of a moving vehicle, the safety guard comprising:

(a) a restraining member being sized and made of a material suitable for restraining a wheel applying force against it, said member having a portion for being positioned in front of, and close to, an outer face of the wheel to block its movement away from the vehicle body;

(b) attachment means for removably attaching the restraining member to the vehicle body about the wheel.

The dimensions of the restraining member can be adjusted to fit different sizes of wheels and vehicles. The restraining member may be provided with a handle to facilitate holding the member during installation and removal.

If a wheel or a tire becomes accidentally loose while rotating, it will rub against the restraining member, thereby causing vibrations and smoke which can be detected by certain embodiments of the invention to provide quick warning to the vehicle driver.

BRIEF DESCRIPTION OF THE DRAWINGS

Exemplary embodiments of the invention will now be described in conjunction with the drawings in which:

FIG. 1 is a front view of a restraining member in accordance with the invention shown, attached to a vehicle and in place for use;

FIG. 2 is a detailed side view of attachment means shown in less detail in FIG. 1;

FIG. 3 is a section of the line II—II taken through the attachment means of FIG. 2; and, FIG. 4 is a front view of an alternative embodiment of the invention including extension means for adjusting the dimensions of a restraining member.

DESCRIPTION OF THE INVENTION

The safety guard in the embodiment illustrated in FIG. 1 includes a restraining member 1 having a middle section 2, a first arm 3 and a second arm 4; the arms are disposed at the first and second ends of the member respectively. The middle section 2 of the restraining member 1 is positioned in front of, and close to, an outer face A of a wheel B to block its accidental movement away from the body of a moving vehicle C. A "vehicle" hereby means any ground transportation means, such as a truck, trailer, automobile, bus, tractor or any other moving machinery, and a "vehicle body" means any part of the vehicle other than the wheels, such as a chassis, frame, fender, floor, or railing.

The member 1 can be made of any material suitable for restraining the wheel B whenever applying force against the member 1 due to the wheel B being accidentally loosened from its normal position. The member 1 can be of any suitable shape, cross section and size, however, in the exemplary embodiment, is a bar with first and second arms 3 and 4, and a middle section 2 to be positioned in front of the wheel face A. In an alternative embodiment of the invention, the member 1 is of sufficient length to be in front of the face A of more than one wheel B. In this respect, "wheel" is hereby used to collectively mean at least one of a plurality of wheels and their tires, all of which being located on one side of the vehicle.

A first attachment means 5 and a second attachment means 6 are secured to the vehicle body C, by fastening means in the form of mounting bolts 7, in the vicinity of the wheel B, with the two attachment means 5 and 6 being positioned on opposite sides of the wheel outer face A. The first and second arms 3 and 4 cooperate with the attachment means 5 and 6 to allow for convenient installation and removal of the member 1, through any suitable complementary mechanisms. In the embodiment of FIG. 1, the first attachment means 25 comprises a first enclosure 5 which, as shown in FIG. 2, has a hollow first core 9 with a first opening 10 towards the wheel B, and a cross section of substantially similar shape to, but slightly larger size than, the cross section of the first arm 3. Similarly, the second attachment 6 comprises a second enclosure having a hollow second core (not shown) with a second opening 11 towards the wheel, the cross section of the second core being of substantially similar shape to, but slightly larger size than, the cross section of the second arm 4. In another embodiment shown in FIG. 3, the first attachment 5 further includes a bore 12 at an angle from, preferably perpendicular to, the first core. In this embodiment a removable locking pin 8 of a similar length to, but of smaller cross section than the bore 12 is inserted into the bore 12 to prevent the first arm 3 from sliding into the first enclosure 25 past the location of the pin 8. The locking pin 8 and the bore 12 can have either threaded or unthreaded surfaces to provide a locking effect.

The restraining member 1 is installed by first moving the first arm 3 towards the first opening 10 and sliding it into the first core 9 of the first attachment 5, then pushing the edge of the first arm 3 past the bore 12 until the edge of the second arm 4 no longer covers the second opening 11, then sliding the second arm 4 towards the second opening 11 into the second core (not shown) of the second attachment 6 until the bore 12 becomes clear of the edge of the first arm 3, and finally inserting the locking pin 8 into the bore 12. The member 1 is as conveniently removed from the vehicle body C by reversing these steps.

In one aspect of the invention, the dimensions of the restraining member 1 are adjusted to fit different sizes of wheels and vehicles by providing extension means 30, an example of which is illustrated in FIG. 4. The extension means 30 is preferably located at the member middle section 2. In the embodiment shown, such extension means 30 are provided by having the member middle section 2 separated at an intermediary point and having the two separate member parts joined by a coupler 13 which can take the form of a third enclosure that is open from both ends. The coupler 13 is adapted freely to embrace the two separated member parts allowing them to slide closer together or farther apart as required while a portion of each member part remains substantially inside the coupler 13. When the required member length is attained, the two member parts are secured to the enclosure by fastening means in the form of bolts 14.

In another aspect of the invention, the restraining member comprises a handle 15 attached preferably to the member middle section 2. This handle 15 facilitates holding the member 1 during installation on and removal from the vehicle body C.

In yet another aspect of the invention, a fault detector 16 is provided which is positioned adjacent to the restraining member 1. In operation, in the instance when the wheel B is accidentally loosened from its normal position, it rubs against the member 1 causing vibrations and smoke. One form of the fault detector 16 comprises means for sensing physical vibrations around the area of the wheel B. Another form of the fault detector 16 comprises means for sensing smoke around the wheel area.

Of course numerous other embodiments may be envisaged, without departing from the spirit and scope of the invention.

What is claimed is:

1. A safety guard for preventing a wheel from coming off the body of a vehicle, the wheel having an axis of rotation, said safety guard comprising:

a restraining member having opposing first and second ends;

a first attachment member releasably secured to a longitudinally extending side of said body on one side of said wheel and configured to define an opening to slidably receive said first end;

a second attachment member releasably secured to said side of the body on a longitudinally opposing side of said wheel and configured to define an opening to slidably receive said second end; and said restraining member being removably secured in longitudinally slidable engagement with and between said first and second attachment members a direction longitudinally extending of the vehicle and immediately adjacent an outer face of said wheel so as to prevent said wheel from moving away from said body.

2. A safety guard as defined in claim 1 further comprising a fault detector positioned adjacent to the restraining member for sensing when a loosened wheel rubs against the member, to warn the vehicle driver.

3. A safety guard as defined in claim 2 wherein the fault detector comprises means for sensing physical vibrations.

4. A safety guard as defined in claim 2 wherein the fault detector comprises means for sensing smoke.

5. The safety guard of claim 1 wherein said restraining member comprises a first arm, a second arm, and a middle portion intermediate said first and second ends.

6. The safety guard of claim 5 wherein said first and second attachment means each respectively comprise an enclosure constructed so as to receive said first and second arms of said restraining member.

7. The safety guard of claim 6 wherein said enclosure of said first attachment means comprises locking means for releasably locking said first arm of said restraining member in said first attachment means.

8. The safety guard of claim 7 wherein said locking means comprises a bore in said first enclosure and a locking pin sized to removably fit within said bore.

9. The safety guard of claim 5 wherein said middle portion and said first and second arms are constructed so as to be U-shaped, when viewed in said wheel from moving away from plan.

10. The safety guard of claim 1 wherein said restraining member further comprises extension means for adjusting the longitudinal length of said restraining member to fit different sizes of wheels and vehicles.

11. The safety guard of claim 1 further comprising a handle means attached to said restraining member for holding said restraining member during installation and removal.

12. A safety guard for preventing a wheel from coming off the body of a vehicle, said safety guard comprising:

a first attachment means releasably secured to a longitudinally extending side of said body on one side of said wheel;

a second attachment means releasably secured to said side of the longitudinally body on opposing side of said wheel; and a restraining member having a first arm, a second arm and a middle portion intermediate said first and second ends so as to be U-shaped when viewed in a longitudinal plane extending vertically through said restraining member, wherein said restraining member is removably secured in slidable engagement with and between said first and second attachment means in a longitudinally extending direction of the vehicle and immediately adjacent an outer face of said wheel so as to prevent said wheel from moving away from said body.

* * * * *